J. K. DE LOACH.
VARIABLE FRICTION DRIVING MECHANISM FOR AUTOMOBILES.
APPLICATION FILED AUG. 13, 1910.
1,008,706.
Patented Nov. 14, 1911.
4 SHEETS—SHEET 1.
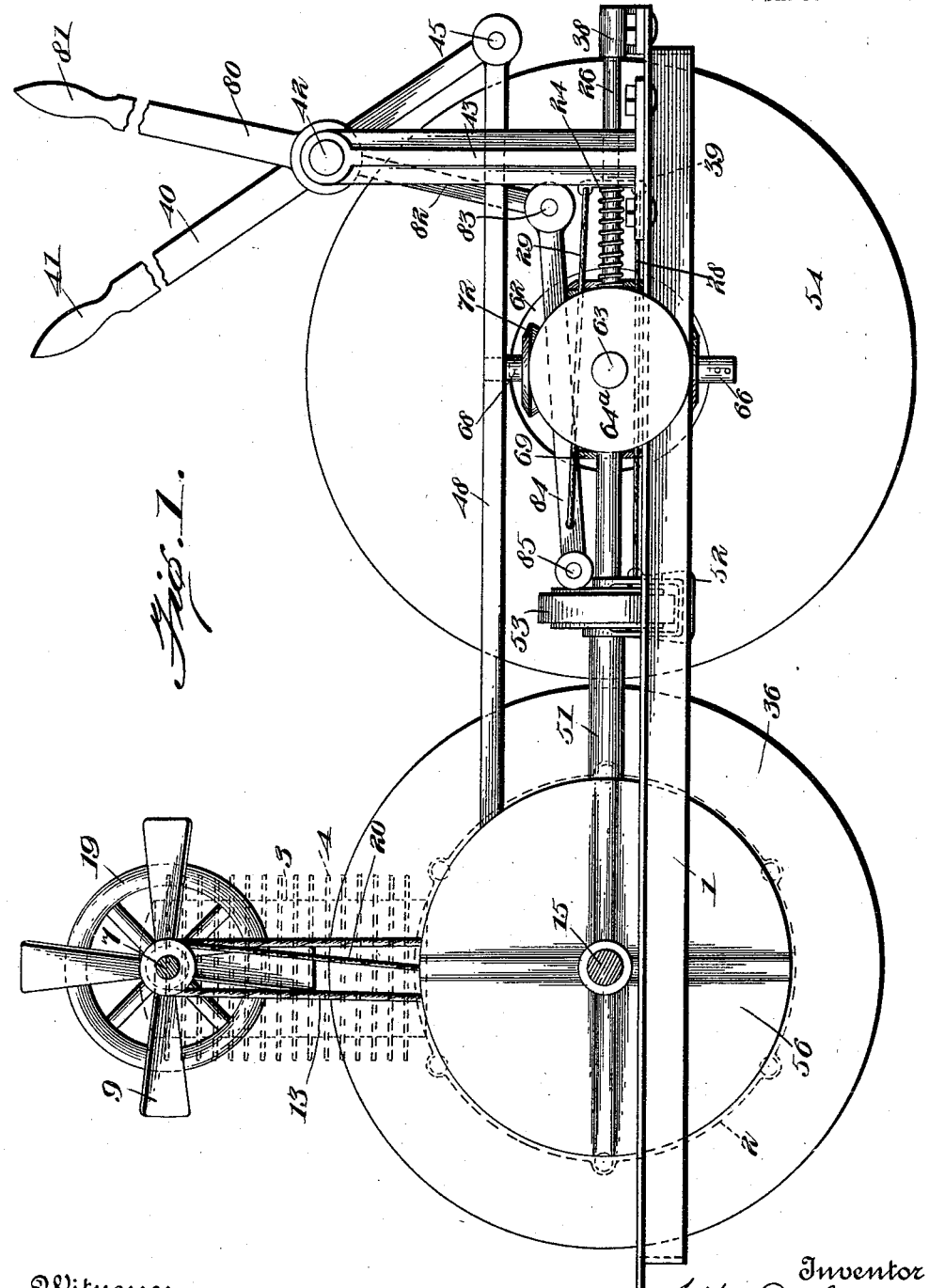

J. K. DE LOACH.
VARIABLE FRICTION DRIVING MECHANISM FOR AUTOMOBILES.
APPLICATION FILED AUG. 13, 1910.
1,008,706.
Patented Nov. 14, 1911.
4 SHEETS—SHEET 2.
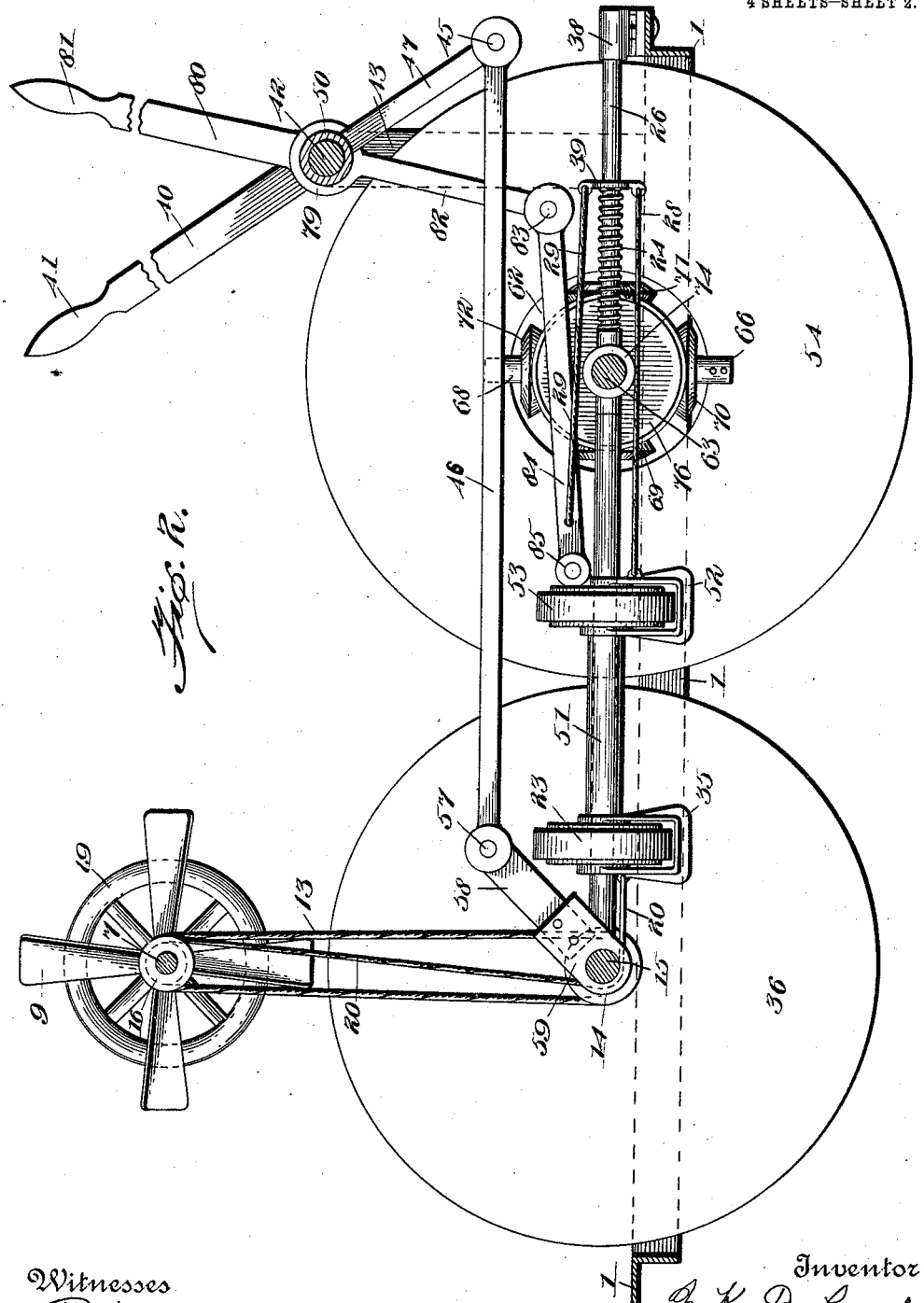
Witnesses
Inventor
J. K. De Loach.
By Wilkinson, Fisher & Witherspoon
Attorneys.

J. K. DE LOACH.
VARIABLE FRICTION DRIVING MECHANISM FOR AUTOMOBILES.
APPLICATION FILED AUG. 13, 1910.
1,008,706.
Patented Nov. 14, 1911.
4 SHEETS—SHEET 3.
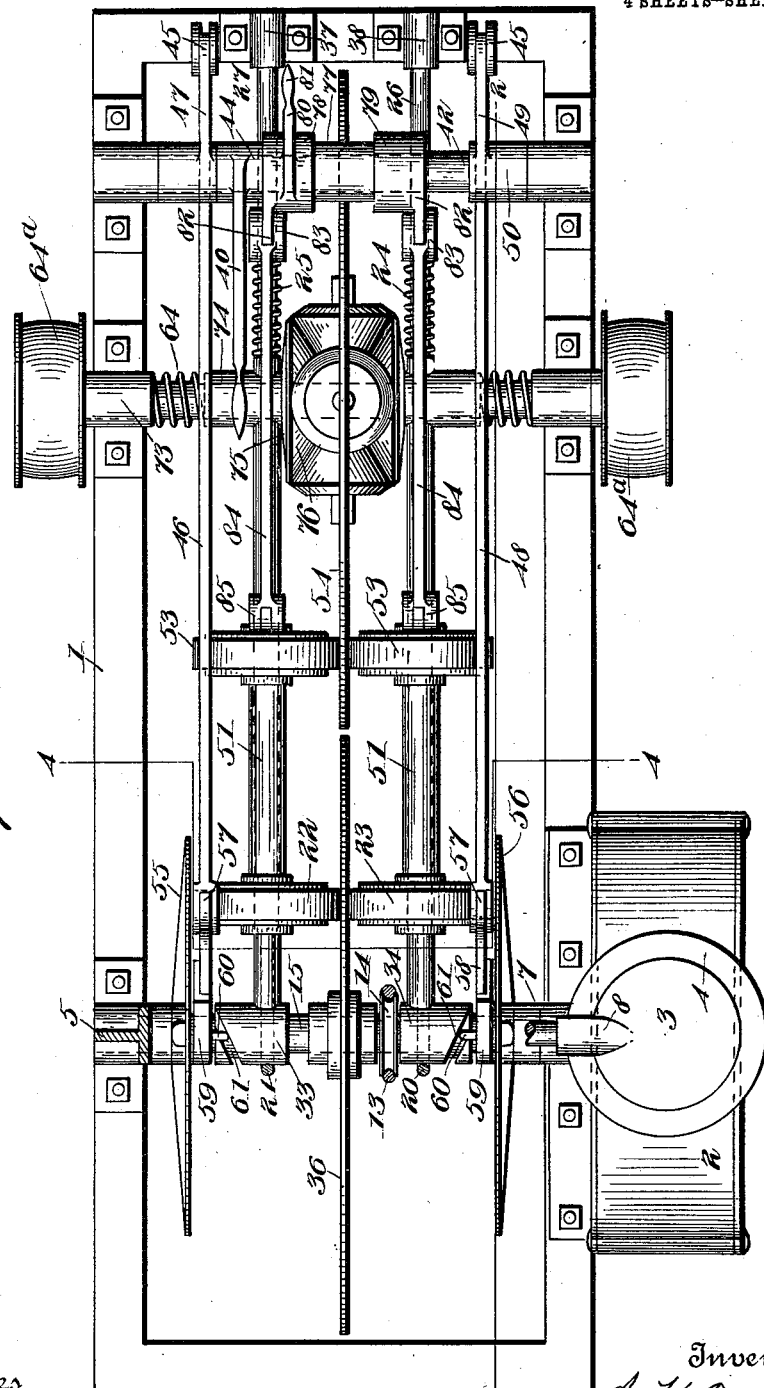

J. K. DE LOACH.
VARIABLE FRICTION DRIVING MECHANISM FOR AUTOMOBILES.
APPLICATION FILED AUG. 13, 1910.
1,008,706.
Patented Nov. 14, 1911.
4 SHEETS—SHEET 4.
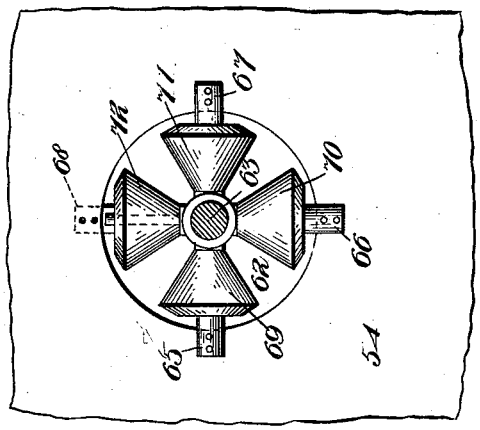
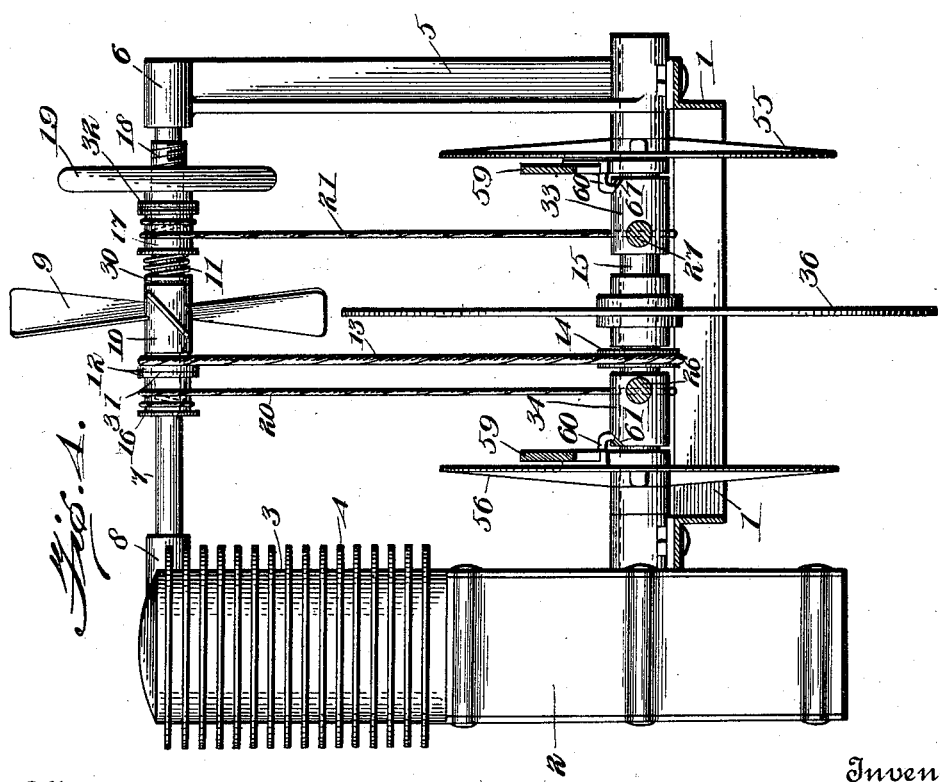

UNITED STATES PATENT OFFICE.

JOHN K. DE LOACH, OF BRIDGEPORT, ALABAMA.

VARIABLE FRICTION DRIVING MECHANISM FOR AUTOMOBILES.

1,008,706.  Specification of Letters Patent.  Patented Nov. 14, 1911.

Application filed August 13, 1910. Serial No. 577,084.

*To all whom it may concern:*

Be it known that I, JOHN K. DE LOACH, a citizen of the United States, residing at Bridgeport, in the county of Jackson and State of Alabama, have invented certain new and useful Improvements in Variable Friction Driving Mechanism for Automobiles; and I do hereby declare the following to be a full, clear, and exact description of the invention, such as will enable others skilled in the art to which it appertains to make and use the same.

My invention relates to improvements in variable friction driving mechanism for automobiles and the object of my invention is to produce a friction driving mechanism which automatically acts on the driven disk to move it fast or slow to suit a varying load and to also provide means whereby the machine may be driven forward or stopped or driven back, all arranged compactly and so framed that it may be installed on any ordinary motor propelled vehicle.

With this object in view, my invention consists in the construction and combination of parts as hereinafter described and claimed.

In the accompanying drawings:—Figure 1 is a side view of my improved friction driving mechanism, partly in section. Fig. 2 is a vertical central section thereof. Fig. 3 is a top plan view thereof, partly in section. Fig. 4 is an end view thereof, the frame being shown in section; and, Fig. 5 is a side view, partly in section showing the vertical beveled friction gear wheels.

1 represents a frame on which the driving mechanism is mounted, made rectangular as shown in Fig. 3. On one side of this frame is mounted the engine inclosed in a casing, the crank case of which is indicated by the character 2 and the cylinder by 3, provided with cooling ribs 4. In the drawing a single cylinder engine is shown, but obviously an engine having any desired number of cylinders could be used.

Mounted on the main frame is an upwardly extending angle bar 5, provided at its top with a bearing 6, in which is mounted a shaft 7, the other end of which is loosely mounted in an extension 8 of the engine casing. Loosely mounted on the shaft 7 is a fan 9, the boss of which is adapted to slide on the shaft 7. A spring 11 is also loosely mounted on said shaft and bears against the ball bearing thrust plate 30 which takes the thrust of the fan. The boss 7 has connected thereto a pulley 12 and a cord or chain 13 passes over this pulley 12 and also over a pulley 14 on the engine shaft 15. Drums 16 and 17 are keyed fast to the shaft 7. The ball bearing thrust plate 30 permits the rotary movement of the fan without interfering with the spring 11.

31 represents a disk clutch which allows the fan boss 10 to drive the drum 16.

Over the drums 16 and 17 run cords or chains 20 and 21 respectively. The cords or chains are fastened to the drums 16 and 17 respectively and pass loosely down over sleeves 33 and 34 mounted on the crank shaft 15. At the other end these cords or chains are attached to yokes such as 35 in which are mounted the friction wheels 22 and 23, said wheels engaging, on opposite sides, the friction disk 36.

26 and 27 represent rods loosely mounted at one end in bearings 37 and 38 on the frame and fixed at the other end to the sleeves 34 and 33 respectively. On the rods 26 and 27 are springs 24 and 25 and each of these springs engages a cut-away portion on the coresponding rod and at the other end bears against a perforated plate such as 39, said plate having perforated ends to which are attached the cords or chains 28 and 29, as shown in Fig. 2.

40 represents a hand lever provided with a handle 41 for setting the friction driving mechanism in three different positions, "forward", "stop", and "back". This lever is pivotally mounted on a shaft 42 carried by uprights 43 on the main frame by means of a sleeve 44 which extends a considerable distance across the top of the machine, as shown in Fig. 3. This hand lever 40 is pivoted at its lower end, as shown at 45, to a link 46, by means of an arm 47 running from the sleeve 44, which sleeve is keyed fast to the shaft 42. 48 represents a similar link on the other side of the machine operated by means of an arm 49 which has its lower end pivoted to said link and which is connected to a sleeve 50 keyed on the shaft 42.

Mounted on the rod 27 is a sleeve 51 connecting the yoke 35 of the friction wheel 22 with the yoke 52 of the friction wheel 53 which bears on one side of the large friction disk 54, the construction on each side of the machine being the same. From the construction described, it is evident that the rotation of the friction disk 36 which is mounted on a collar fastened to the driving axle 15 will move the disk 54. To the shaft 15 are also keyed two other friction disks 55 and 56.

The link 46 is pivotally mounted at one end at 57 to an arm 58 which is fastened to a collar 59 loosely mounted on the shaft 15. This collar has projecting from its inner face a bent pin 60 which engages in a cam groove 61 in the sleeve 33. From the construction described, it is evident that a movement of the lever 40 from the position shown to a vertical position will, by means of the pin and groove 60 and 61 shift the sleeve 33 upon the shaft 15 and disengage the friction wheel 22 from the disk 36, the construction and operation being the same on each side of the machine, and the rod 27 which is loosely mounted in the bearing 37 swings enough about said bearing as a center, to cause the friction wheel 22 to be disengaged from the friction disk 36 thereby stopping the machine. In this position the engine may be cranked for starting. A still further movement of the lever 40 will move the friction wheel 22 against the friction disk 55 and, the friction wheel 53 being still in contact with the friction disk 54 will cause the machine to move back.

The friction disk 54 has a central aperture 62 best shown in Fig. 5, and centrally through this aperture runs a driving shaft 63 which is provided with a pulley on either end such as 64ª from which the power is taken. Across the aperture 62 is fastened a spider frame consisting of arms such as 65, 66, 67 and 68 bolted to the friction disk 54. On each one of these arms is loosely mounted a smooth face, cone-shaped friction pulley, said pulleys being denoted by the characters 69, 70, 71 and 72. On the shaft 63 is mounted a spring 64 which bears against the shaft bearing 73 on one end and at the other end on a sleeve 74, the inner end of which bears against a spring washer 75, although an ordinary spring might be used, which washer in turn bears against a smooth face, beveled friction wheel 76, the construction being the same on each side of the machine. In passing, it might be noted that the spring 64 will keep the friction wheel 76 always in contact with the friction pulleys 69, 70, 71 and 72 and therefore will always keep the friction wheel 53 in contact with the friction disk 54.

Loosely mounted on the shaft 42 is a sleeve 77 having enlargements 78 and 79 thereon and made integral with or attached to one of said enlargements is a lever 80 having a handle 81. To the lower part of the enlargement 79 and preferably made integral therewith is an arm 82 to the lower end of which, at the point 83, is pivotally connected a link 84, the other end of which is pivotally connected at 85 to the yoke 52 of the friction wheel 53, the construction being the same on each side of the machine. The cord 29 passes through a perforation in the link 84 and is fastened to said link at one end and at the other end is fastened to the part 39, as already described, while the cord 28 is fastened to the part 39 at one end and to the yoke 52 at the other end.

The operation is as follows:—When it is desired to start the machine, the lever 40 is brought to a vertical position, in which position the friction wheels 22 and 23 do not bear against the disks on either side of them. If it is desired to move forward, the lever 40 is brought back into the position shown in Figs. 1 and 2, which shifts the friction gear wheels 22 and 23 into contact with the friction disks 36. By the connections already described the shaft 63 is then rotated. If, after the machine is started, it is desired to disconnect the engine from the shaft 63, or to back the machine, this may be done by means of the lever 40 as already described. If, while the machine is running, the engine slows down because the load becomes too great, as for instance if the machine is climbing a steep hill, the friction wheels are automatically shifted upon the disks 36 and 54, as already described; that is, the engine being over-loaded, the fan 9 revolves at a slower speed and the consequent reduction of the thrust on said fan allows the spring 11 to force the hub or boss of the fan against the friction disk clutch 31 causing the shaft 7 and the spools 16 and 17 to revolve. This winds up the cords 20 and 21 drawing the friction wheels 22 and 23 closer to the shaft 15 whereupon said wheels revolve at a slower rate and consequently the whole machine moves more slowly. If, while the machine is running, the engine has a tendency to idle or race, to a reduction in its load, as may happen when the machine comes upon a smooth portion of road or is coming down hill, the friction wheels 22 and 23 are automatically shifted upon the disks 36 and 54 as already described; that is, the engine running at a very high speed drives the fan 9 at a high speed and consequently increases the thrust of the boss of the fan upon the spring 11, and allows the parts of the friction disk clutch 31 to be wholly disengaged. This leaves the cords 20 and 21 free to unwind under the influence of the springs 24 and 25 drawing the friction wheels 22 and 23 away from the shaft 15 whereupon said wheels revolve at a faster rate and consequently the whole machine runs faster. The speed of the machine, however, is always under control of the operator by means of the lever 80, since the shifting means being only mildly positive in its action the operator can throw the lever 80 so as to shift the friction wheels into the desired positions on the disks 36 and 54.

The differential gearing, already described, in connection with the disk 54 permits the machine to go around corners.

It will thus be seen that I have provided a variable friction gearing subject to the will of the operator by means of the lever 80 and which if uncontrolled, automatically speeds the driven disk 54 fast or slow according to the varying conditions of load.

The device is particularly adapted for light powered delivery or farm wagons. Take, for example, a one ton capacity wagon with four horse power engine and designed to drive with full power at any speed from half a mile to thirty miles per hour. The operator disengages the driving friction wheels by means of the lever 40 and cranks his engine. Supposing that he wants to make a quick trip with the empty wagon to get freight. With the engine regulated at full speed by hand wheel and gasolene control he throws the friction wheels into contact with the disk 36. The engine will run at uniform speed and drive the wagon at thirty miles an hour when the grade permits or automatically compound the power down to half a mile per hour if necessary. After receiving the load no adjustment is necessary, the automatic speed control takes advantage of every decreasing load or change in grade to give more speed and, what is more important, acts instantaneously to slow down the vehicle when the motor is over-taxed.

I claim:—

1. In a variable friction driving mechanism, the combination of driving and driven friction disks and connected friction wheels, and a governor operatively connected with the friction wheels and driven by the driving disk for moving the friction wheels upon the driving and driven friction disks toward and away from their centers, substantially as described.

2. In a variable friction driving mechanism, the combination of driving and driven friction disks and friction wheels connected together, a fan operated from the driving disk, and means connecting the fan with the friction wheels for transmitting the motion of the fan to shift the friction wheels upon said disks, substantially as described.

3. In a variable friction driving mechanism, the combination of a driving friction disk and a shaft therefor, a second shaft, a driven friction disk fixed on the second shaft, sleeves slidably mounted on the second shaft, rods supported by the sleeves and extending parallel to the disks, friction wheels slidably mounted on the rods, means connecting the friction wheels on each rod, the friction wheels being arranged to contact with the driving and driven disks, and a governor connected with the friction wheels and operated from the driving shaft for moving said friction wheels longitudinally to regulate the speed of the driven friction disk, substantially as described.

4. In a variable friction driving mechanism, the combination of a driving friction disk and a shaft therefor, a second shaft, a driven friction disk fixed on the second shaft, sleeves slidably mounted on the second shaft, rods supported by the sleeves and extending parallel to the disks, sleeves on the rods, friction wheels carried by the second mentioned sleeves and arranged to contact with the driving and driven disks, a spindle, a fan loosely mounted on the spindle, drums fixed on the spindle, a coil spring on the spindle and interposed between one of the drums and the fan, flexible members connected to the drums and having their opposite ends secured to the sleeves on the rods whereby the rotation of the fan is transmitted to the friction wheels to change their position on said disks, substantially as described.

5. In a variable friction driving mechanism, the combination of driving and driven friction disks and friction wheels connected together, a fan operated from the driving disk, means connecting the fan with the friction wheels for transmitting the motion of the fan to automatically shift the friction wheels upon said disks, and means for changing at will the position of the friction wheels upon said disks in opposition to said fan, substantially as described.

6. In a variable friction driving mechanism, the combination of a driving friction disk and a shaft therefor, a second shaft, a driven friction disk fixed on the second shaft, sleeves slidably mounted on the second shaft, rods supported by the sleeves and extending parallel to the disks, friction wheels connected to rotate together and slidably mounted on each rod, the rods being arranged to swing from one end to throw the friction wheels out of contact with the driving and driven disks, a governor connected with the friction wheels and operated from the driving shaft for moving said friction wheels longitudinally to regulate the speed of the driven friction disk, and means for swinging the friction wheels at will out of contact with said disks, substantially as described.

7. In a variable friction driving mechanism, the combination of a driving friction disk and a shaft therefor, a second shaft, a driven friction disk on the second shaft, sleeves slidably mounted on the second shaft, rods supported by the sleeves and extending parallel to the disks, sleeves on the rods, friction wheels carried by the second mentioned sleeves, the rods being arranged to swing the friction wheels out of contact with the driving and driven disks, yokes slidably mounted on the rods and embracing the friction wheels, a spindle, a fan loosely mounted on the spindle, drums fixed on the spindle, a coiled spring on the spindle and interposed between one of the drums and the fan, flexible members connected to the drums and having their opposite ends secured to the yokes on the rods whereby the friction wheels will be shifted upon said disks according to the varying conditions and load, a hand lever, and links connecting the hand lever and the yokes, substantially as described.

8. In a variable friction driving mechanism, the combination of a driving friction disk and a shaft therefor, a second shaft, a driven friction disk fixed on the second shaft, sleeves slidably mounted on the second shaft, said sleeves being provided with cam grooves, rods supported by the sleeves and extending parallel to the disks, sleeves on the rods, friction wheels carried by the second mentioned sleeves and arranged to normally contact with the driving and driven disks, the rods being arranged to swing from one end, collars loosely mounted on the second shaft, pins carried by said collars, and means for rotating the collars to cause the pins to enter the cam grooves for swinging the friction wheels out of contact with said disks, substantially as described.

In testimony whereof, I affix my signature, in presence of two witnesses.

JOHN K. DE LOACH.

Witnesses:
S. N. GLOVES,
R. L. McLELLAN.

Copies of this patent may be obtained for five cents each, by addressing the "Commissioner of Patents, Washington, D. C."